United States Patent [19]
Vaillant

[11] Patent Number: 5,469,001
[45] Date of Patent: Nov. 21, 1995

[54] SWITCH NETWORK

[75] Inventor: Bruno Vaillant, Toulouse, France

[73] Assignee: Societe Anontme Dite Alcatel Espace, Courbevoie, France

[21] Appl. No.: 156,905

[22] Filed: Nov. 24, 1993

[30] Foreign Application Priority Data

Nov. 27, 1992 [FR] France .................................. 92 14313

[51] Int. Cl.$^6$ .................................................. H04L 12/00
[52] U.S. Cl. .............................. 307/113; 307/42; 307/112
[58] Field of Search ...................................... 333/101, 105; 307/112, 113, 115, 42, 147, 38, 39, 40, 41

[56] References Cited

U.S. PATENT DOCUMENTS

| | | | |
|---|---|---|---|
| 3,537,035 | 10/1970 | Graham | 333/103 |
| 4,061,989 | 12/1977 | Petrelis | 333/101 |
| 4,070,637 | 1/1978 | Assal et al. | 333/105 |
| 4,247,787 | 1/1981 | Page | 307/112 |

OTHER PUBLICATIONS

IEEE Transactions on Computers, vol. C–30, No. 2, Feb. 1981, New York, US, pp. 164–168; J. Gescei et al.: "The Topology of Cellular Partitioning Networks".

IEEE Transactions on Reliability, vol. 39, No. 3, Aug. 1990, New York, US, pp. 301–308; J. Fried et al.: "Reliability Models For Facilities Switching".

*Primary Examiner*—William M. Shoop, Jr.
*Assistant Examiner*—Jonathan S. Kaplan
*Attorney, Agent, or Firm*—Sughrue, Mion, Zinn, Macpeak & Seas

[57] ABSTRACT

A network of switches for a multiple channel installation adapted to establish connections each between one of N input ports and one of T output ports includes: a plurality of cords each having a first end connected to a first nodal switch, a second end connected to a second nodal switch and, between said two ends, at least one cord switch; optionally, a plurality of branches which comprise a switch having one pole at most connected to an input port, two poles available for the connection of output ports and one pole connected to a pole of a nodal switch; and a plurality of nodal switches interconnected by cords, the input and output ports being connected to the available poles of the switches of the network.

8 Claims, 3 Drawing Sheets

FIG.1a  FIG.1b  FIG.1c  FIG.1d  FIG.1e
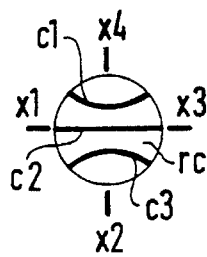 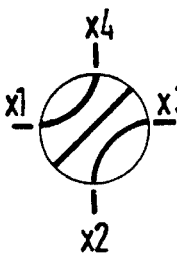 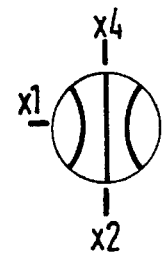 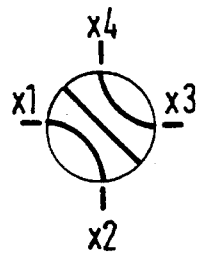 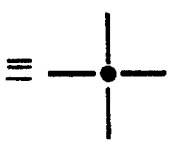
FIG.2a  FIG.2b  FIG.2c
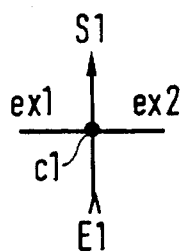 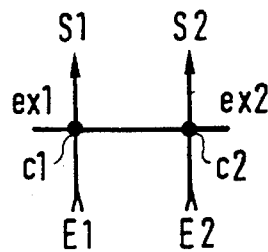 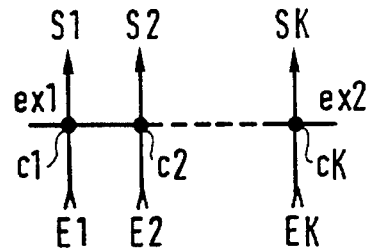
FIG.2d  FIG.2e
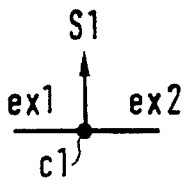 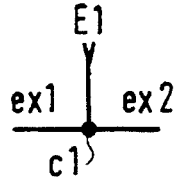
FIG.3a  FIG.3b
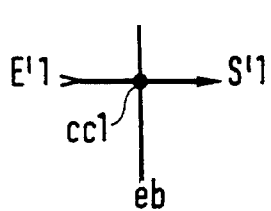 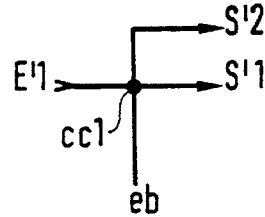
FIG.4a  FIG.4b  FIG.4c
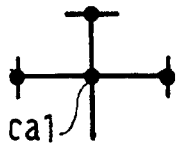 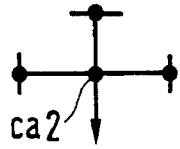 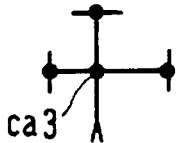

5,469,001

SWITCH NETWORK

BACKGROUND OF THE INVENTION

1. Field of the Invention

The present invention concerns a network of switches having N input ports and T output ports adapted to connect mutually and individually any P from N inputs and any P from T outputs (P≦N and P≦T).

By resetting the switches the choice of the P inputs or the P outputs can be modified.

This rearrangement must be done with minimum disturbance, i.e. causing as few as possible modifications of existing connections, whilst ensuring that the connections set up pass through the fewest possible switches.

The terms input and output as just used are naturally interchangeable from the point of view of the switch network, with the result that this discussion can be limited to the case T>N.

2. Description of the Prior Art

Networks of this kind are used in telecommunication satellites to set up P simultaneous communication channels chosen by the operator from N possible channels and connecting them individually to P from T equipments of the same type.

They guard against failure of these equipments (T-P equipments maximum), for example. Two symmetrical networks are usually employed, one on each side of the equipments, and their switches are operated simultaneously.

This arrangement enables each of the P (from N) inputs to be connected to one of the P (from T) equipments, which equipment is then connected to one of T inputs of the symmetrical network, which connects it to an output having the same position as the input of the first network.

The switches used in these networks have four poles and connect a first pole to a second, third or fourth pole and correspondingly connect said third pole to said fourth, first or second pole. Using arbitrarily assigned pole numbers:

a three-position switch connects a first pole to a second and a third to a fourth, or a first pole to a third and a second to a fourth, or a first to a fourth and a second to a third;

a four-position switch connects a first pole to a second and a third to a fourth, or a first to a third, or a first to a fourth and a second to a third, or (in the last position) a second to a fourth.

Known network structures are of two types, namely linear (or chain) and ring structures.

The linear or chain structure is used when N=P and T=P+1 or T=P+2. Each switch is connected to its two neighbours except for the two switches at the ends which are connected to the remainder of the network by a single pole. The other available poles of the intermediate switches are respectively assigned to an input and an output. The three available poles of the two switches at the ends of the network are connected one to an input and the other(s) either to a single output, one pole remaining uncommitted, or to two outputs.

The ring structure used in the other cases comprises a main loop comprising all of the switches connected together by two of their poles, each of the other two poles being connected to an input, to an output or to another switch of the ring by a direct link.

These structures have many limitations. They require a high number of switches to implement their function, the rearrangements usually cause extensive modifications to connections already set up, and the number of switches through which the signal passes can then be high.

An object of the present invention is a network having the functions defined above and using the same types of four-pole switches which does not suffer from the drawbacks of known networks.

SUMMARY OF THE INVENTION

In one aspect, the present invention consists in a network of switches comprising N input ports and T output ports adapted to connect mutually and individually any P inputs and any P outputs (P≦N and P≦T), the switches having four poles and enabling a first pole to be connected to a second, a third or a fourth pole and, correspondingly, said third pole to be connected to said fourth, first or second pole, the structure of said network comprising a plurality of nodal switches, each of said nodal switches being connected to at least one of the other nodal switches by at least one path, and a plurality of cords, a cord being a chain comprising at least one cord switch, each cord switch providing access to at least one input or output and being connected to two other switches at most, each cord being further connected to two nodal switches, in which network a plurality of separate paths are provided between two nodal switches, at least one of them comprising at least one cord.

In a second aspect, the present invention consists in a network of switches comprising N input ports and T output ports adapted to connect mutually and individually any P inputs and any P outputs, where P=N and T>P+2, the switches having four poles and enabling a first pole to be connected to a second, a third or a fourth pole and, correspondingly, said third pole to be connected to said fourth, first or second pole, the structure of said network comprising at least one nodal switch and at least one branch, which is an arrangement comprising a switch, one pole of which is connected to an input port, two poles are available for the connection of two output ports at most and one pole is connected to a pole of a nodal switch.

In a third aspect, the present invention consists in a network of switches comprising N input ports and T output ports adapted to connect mutually and individually any P inputs and any P outputs (P≦N and P≦T), the switches having four poles and enabling a first pole to be connected to a second, a third or a fourth pole and, correspondingly, said third pole to be connected to said fourth, first or second pole, the structure of said network comprising a plurality of nodal switches each of said nodal switches being connected to at least one of the other nodal switches by at least one path, and a plurality of cords, a cord being a chain comprising at least one cord switch, each cord switch providing access to at least one input or output and being connected to two other switches at most, each cord being further connected to two nodal switches, in which network at least one nodal switch is connected to at least three cords or branches, or a combination of three cords or branches, a branch being an arrangement comprising a switch one pole of which is connected to an input port, two poles which are available for the connection of two output ports at most and one pole of which is connected to one pole of a nodal switch.

Thus the network comprises nodal switches interconnected by cords.

At least three cords are connected to a nodal switch.

Another form of network in accordance with the invention comprises at least three branches each comprising a switch of which not more than one pole is connected to an input port, two poles are available for the output port connection and one pole is connected to a pole of a switch of a nodal point.

More complex networks using and combining the structures described above are evidently within the scope of the present invention.

The various objects and features of the invention will emerge more clearly from the following description of embodiments of the invention given with reference to the appended drawings.

BRIEF DESCRIPTION OF THE DRAWINGS

FIGS. 1a through 1e are various representations of a four-position switch usable in the network of the present invention.

FIGS. 2a through 2e show examples of cords used in the network of the present invention.

FIGS. 3a and 3b show examples of branches used in the network of the present invention.

FIGS. 4a, 4b, 4c show examples of nodal switches.

DETAILED DESCRIPTION OF THE INVENTION

The switch of FIGS. 1a through 1e comprises four poles x1, x2, x3, x4 interconnected in a way which depends on the switch setting by a rotor rc having connecting paths vc1, vc2, vc3. In FIG. 1a it makes the connection x1-x3. In FIG. 1b it makes the connections x1-x4 and x2-x3. In FIG. 1c it makes the connection x4-x2 and in FIG. 1d it makes the connections x1-x2 and x4-x3.

FIG. 1e shows a symbol used to represent this switch in the later figures.

A variant of this switch (not shown) which has only three settings makes the connections of FIGS. 1a and 1c simultaneously.

The following terminology is used in the description of the invention:

nodal switch: a switch of which at least three poles are connected to three other switches;

cord switch: a switch of which two poles are connected to two other switches and two other poles are available to provide access to at least one input or output;

direct link: a connection between two nodal switches with no cord switch;

cord: a connection between two nodal switches comprising at least one cord switch;

branch: a set comprising at least one switch connected to the remainder of the network by a single link.

FIGS. 2a through 2e show three variants of a cord used in the network of the present invention, i.e. an arrangement comprising one, two or more cord switches C1, C2, Ck as represented in FIG. 1e disposed in a chain between two cord extremities ex1 and ex2, with one pole of C1 connected to the extremity ex1, another connected to a pole of C2, another pole of C2 connected to a pole of C3, and so on up to the last switch Ck of the chain, one pole of which is connected to the extremity ex2. The other poles of the switches of the cord are connected to inputs e1, e2, etc each represented by an arrow facing towards the switch, outputs s1, s2, etc each of which is represented by an arrow pointing away from the switch, or are unassigned.

FIGS. 3a and 3b show examples of branches used in the network of the present invention. This is a subset of the network having a single link to the latter. In practise a branch comprises a branch switch cc1 one pole of which is connected to an input E'1, another to a branch extremity eb, the last two poles to two outputs S'1 and S'2 (FIG. 3b) or to a single one, the remaining pole being uncommitted (FIG. 3a).

FIGS. 4a, 4b and 4c show three types of nodal switch, a nodal switch being a switch of which at least three poles are connected to three other switches: in FIG. 4a the nodal switch ca1 is connected to three other switches, its fourth pole being uncommitted; in FIG. 4b the nodal switch is connected to three other switches and to one output; in FIG. 4c the nodal switch is connected to three other switches and one input.

Figure 5:
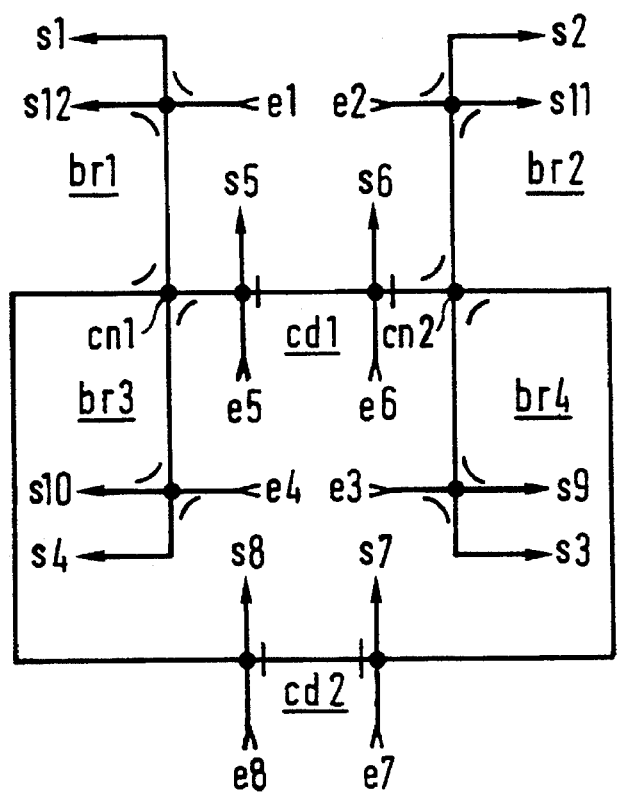
FIGS. 5, 6 and 7 show three examples of networks of switches in accordance with the invention.

FIG. 5 shows a first example of a network of switches in accordance with the present invention. This network has eight input ports e1 through e8, 12 output ports s1 through s12, two nodal switches cn1, cn2, two cords cd1, cd2 and four branches br1, br2, br3 and br4.

Note that this network has at least three branches, br1, br2, br3, for example.

Curved or straight lines near the switches indicate the connections initially set up: e1-s1, e2-s2, e3-s3, e4-s4, e5-s5, e6-s6, e7-s7, e8-s8. The outputs s9 through s12 are available and connected to the nodal switches. If necessary, each can take over from a faulty output in a branch, subject to a single switching operation.

Variants of the FIG. 5 network (not shown) have cords as shown in FIGS. 2a, 2c, 2d or 2e, branches absent or reduced to one output or one input, or conform to FIG. 3a.

Figure 6:
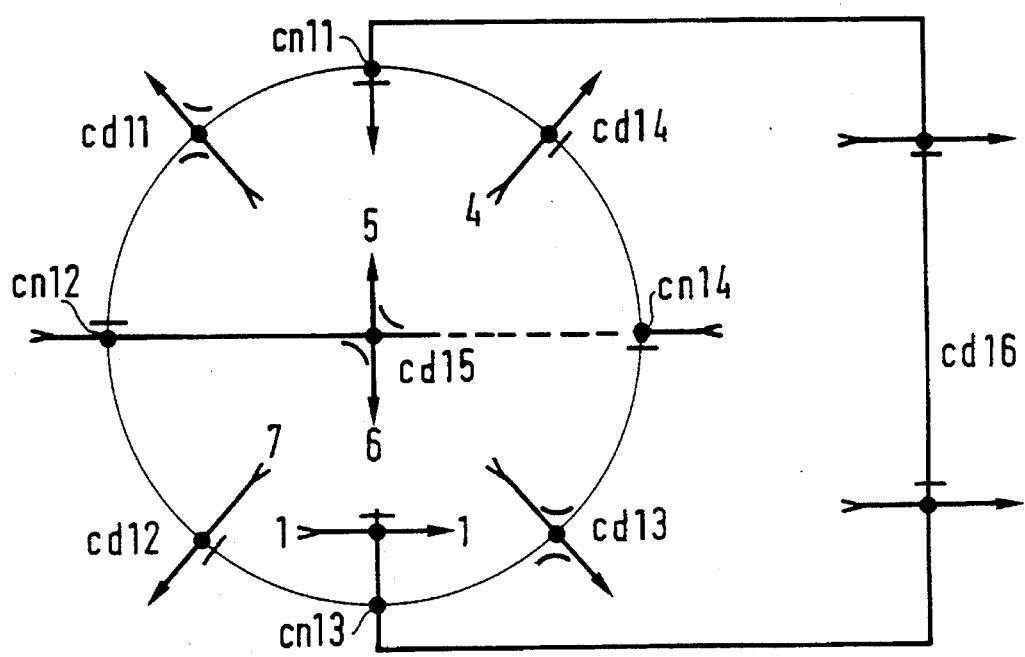

Others, such as that of FIG. 6, have more than two nodal switches (cn11 through cn14), more than two cords (cd11 through cd16) and optionally no branches.

Note that there are two nodal switches cn11 and cn13, for example, which are interconnected by three separate paths (cord cd16; cords cd14 and cd13; cords cd11 and cd12).

Figure 7:
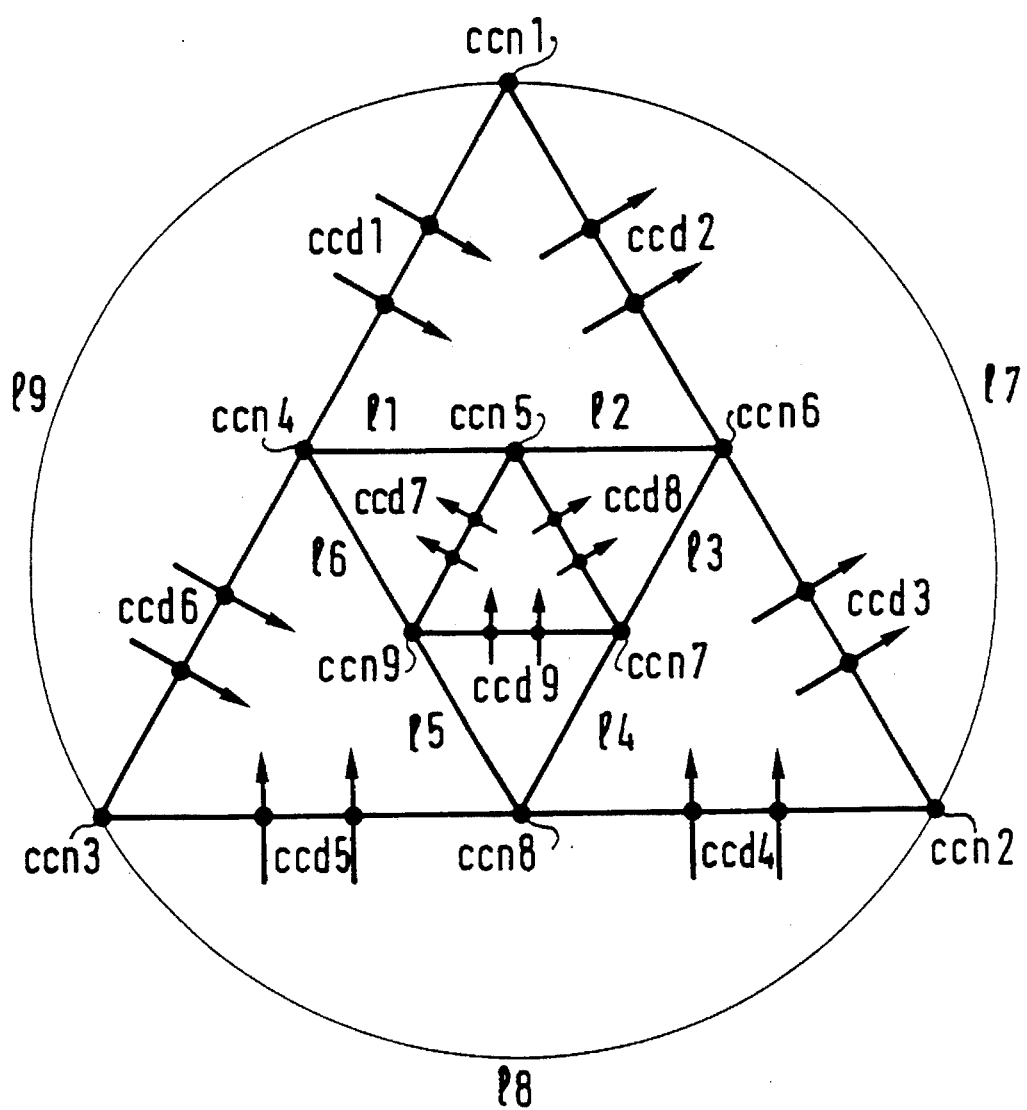

Further variants are feasible, such as that of FIG. 7 which comprises nine nodal switches ccn1 through ccn9, no branches, nine cords ccd1 through ccd9 and nine links li1 through li9. Again there are pairs of nodal switches (ccn4 and ccn5, for example) interconnected by at least three separate paths (16, ccd7; ccd1, ccd2, 12; ccd6, ccd5, 14, ccd8).

The structure of the network in accordance with the present invention can implement the stated function with a small number of switches. The P paths pass through the minimum number of switches. By carefully choosing the initial setting of the switches rearrangement causes minimal disturbance.

There is claimed:

1. Network of switches comprising N input ports and T output ports adapted to connect mutually and individually any P inputs and any P outputs ($P \leq N$ and $P \leq T$), the switches having four poles and enabling a first pole to be connected to a second, a third or a fourth pole and, correspondingly, said third pole to be connected to said fourth, first or second pole, the structure of said network comprising a plurality of nodal switches, each of said nodal switches being connected to at least one of the other nodal switches by at least one path, and a plurality of cords, a cord being a chain comprising at least one cord switch, each cord switch providing access to at least one input or output and being connected to two other switches at most, each cord being further connected to two nodal switches, in which network a plurality of separate paths are provided between two nodal switches, at least one of them comprising at least one cord.

2. Network of switches according to claim 1 wherein the various separate paths between two nodal switches all comprise at least one cord.

3. Network of switches according to claim 1 wherein at least three paths are connected to each nodal switch.

4. Network of switches according to claim 1 comprising at least two nodal switches interconnected by at least one cord and to which branches are connected.

5. Network of switches comprising N input ports and T output ports adapted to connect mutually and individually any P inputs and any P outputs, where P=N and T>P+2, the switches having four poles and enabling a first pole to be connected to a second, a third or a fourth pole and, correspondingly, said third pole to be connected to said fourth, first or second pole, the structure of said network comprising at least one nodal switch and at least one branch, which is an arrangement comprising a switch, one pole of which is connected to an input port, two poles are available for the connection of two output ports at most and one pole is connected to a pole of a nodal switch.

6. Network of switches according to claim 5 comprising at least three branches.

7. Network of switches according to claim 5 comprising at least two nodal switches interconnected by at least one cord and to which branches are connected.

8. Network of switches comprising N input ports and T output ports adapted to connect mutually and individually any P inputs and any P outputs ($P \leq N$ and $P \leq T$), the switches having four poles and enabling a first pole to be connected to a second, a third or a fourth pole and, correspondingly, said third pole to be connected to said fourth, first or second pole, the structure of said network comprising a plurality of nodal switches each of said nodal switches being connected to at least one of the other nodal switches by at least one path, and a plurality of cords, a cord being a chain comprising at least one cord switch, each cord switch providing access to at least one input or output and being connected to two other switches at most, each cord being further connected to two nodal switches, in which network at least one nodal switch is connected to at least three cords or branches, or a combination of three cords or branches, a branch being an arrangement comprising a switch one pole of which is connected to an input port, two poles which are available for the connection of two output ports at most and one pole of which is connected to one pole of a nodal switch.

\* \* \* \* \*